United States Patent
Kwon et al.

(10) Patent No.: US 7,268,685 B2
(45) Date of Patent: Sep. 11, 2007

(54) RADIO FREQUENCY IDENTIFICATION TAG FOR TRANSMITTING TEMPERATURE DATA AND METHOD THEREFOR

(75) Inventors: Sang-wook Kwon, Seongnam-si (KR); Ja-nam Ku, Yongin-si (KR); Il-jong Song, Suwon-si (KR); Young-hoon Min, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 260 days.

(21) Appl. No.: 11/147,163

(22) Filed: Jun. 8, 2005

(65) Prior Publication Data
US 2005/0270153 A1  Dec. 8, 2005

(30) Foreign Application Priority Data
Jun. 8, 2004  (KR) ............... 10-2004-0041936

(51) Int. Cl.
  *G08B 13/14*  (2006.01)
(52) U.S. Cl. .................. 340/572.1; 340/572.4; 340/572.7
(58) Field of Classification Search ......... 340/572.1, 340/572.2, 572.4, 572.7, 10.1, 10.3, 10.4, 340/10.41, 661; 455/41.2, 558; 327/101, 327/102, 103
See application file for complete search history.

(56) References Cited
U.S. PATENT DOCUMENTS 6,452,427 B1 * 9/2002 Ko et al. .................. 327/101
6,480,699 B1 * 11/2002 Lovoi ...................... 455/41.2
7,068,173 B2 * 6/2006 Shanks et al. ............ 340/572.4
7,102,523 B2 * 9/2006 Shanks et al. ............ 340/572.7
7,116,240 B2 * 10/2006 Hyde ....................... 340/661

FOREIGN PATENT DOCUMENTS

JP  7-321697 A  12/1995

\* cited by examiner

*Primary Examiner*—Van T. Trieu
(74) *Attorney, Agent, or Firm*—Sughrue Mion, PLLC

(57) ABSTRACT

A radio frequency identification tag, used in a radio frequency identification system, includes an antenna unit for receiving an external magnetic wave to generate an induced current; a driving voltage generating unit for converting the induced current into a constant voltage and outputting the constant voltage; and a state detecting unit for detecting information about a change in an operational state of the driving voltage generating unit. The tag further includes a memory for storing temperature data corresponding to the information about the change in the operational state and data needed for identification; and a controlling unit for reading out, from the memory, the temperature data dependent on the information about the change in the operational state detected by the state detecting unit and the identification data. The read temperature and identification data are transmitted via an antenna unit.

18 Claims, 6 Drawing Sheets

RADIO FREQUENCY IDENTIFICATION TAG FOR TRANSMITTING TEMPERATURE DATA AND METHOD THEREFOR

CROSS-REFERENCE TO RELATED APPLICATIONS

This application claims priority from Korean Patent Application No. 10-2004-0041936, filed on Jun. 8, 2004, in the Korean Intellectual Property Office, the disclosure of which is incorporated herein in its entirety by reference.

BACKGROUND OF THE INVENTION

1. Field of the Invention

Apparatuses and methods consistent with the present invention relate to radio frequency identification and, more particularly, to a tag for radio frequency identification for measuring temperature of an object with the tag and transmitting the measured temperature together with identification data needed for identification.

2. Description of the Related Art

The recent development of radio technology leads to various radio frequency identification (RF-ID) systems, such as simple prepaid bus traffic cards and pass cards for parking lots and research institutes.

Figure 1:
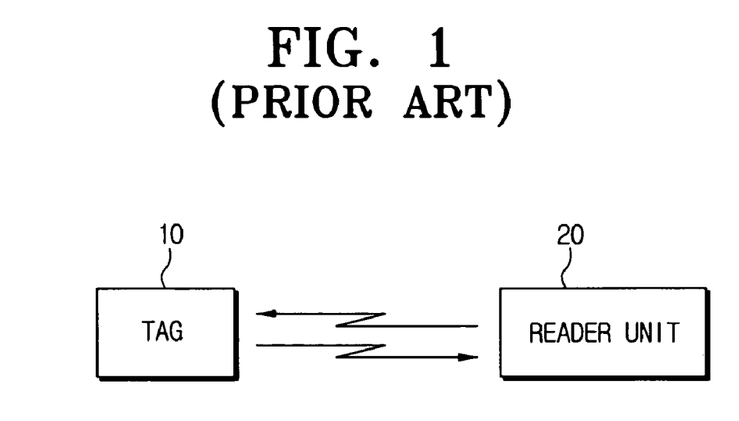
FIG. 1 is a schematic diagram illustrating a configuration of a general radio frequency identification system.

FIG. 1 is a schematic diagram illustrating a configuration of a general radio frequency identification system. Referring to FIG. 1, the radio frequency identification system is largely composed of a tag 10 and a reader unit 20. The tag 10 may be fabricated in the various forms such as a card, a sticker, or the like depending on a user's convenience and use.

Radio frequency identification is basically accomplished by radio frequency signal exchange between the tag 10 and the reader unit 20. Specifically, an integrated circuit (not shown) embedded in the tag 10 reads information needed for identification from an internal memory and outputs the information as a radio frequency signal, and the reader unit 20 receives and confirms the information.

The radio frequency identification system may be classified into an active radio frequency identification system or a passive radio frequency identification system, depending on a driving manner for the integrated circuit (IC) embedded in the tag 10. The term active means an IC driving manner that uses a battery embedded in the tag 10, and the term passive means an IC driving manner that induces current from a magnetic wave, which is received from the reader unit 20, and uses the induced current to drive the IC.

In many applications, the passive radio frequency identification system having no battery is used, allowing a thin light tag 10. The tag 10 includes a coil therein in order to implement the passive radio frequency identification system. The coil serves as an antenna that derives current from the magnetic wave received via the reader unit 20 and transmits identification data as a radio frequency signal needed for identification. The input signal derived at the coil is converted to a given size of constant voltage and the constant voltage is applied to the IC, to drive it. The conversion of the input signal derived at the coil to the constant voltage needs a rectifier. The rectifier may be implemented using a voltage doubler, or the like. The IC, driven with the constant voltage, reads out identification data stored in the internal memory and transmits the data as a given radio frequency signal via the coil.

Meanwhile, use of a typical p-n diode to implement the rectifier for the tag 10 significantly degrades efficiency of detecting a low-power input signal because of a high forward turn-on voltage of the p-n diode. To prevent the degradation of the detection efficiency, use of a schottky diode, having a low forward turn-on voltage, has been actively studied. In particular, a radio frequency identification system operating at a high frequency band has been recently developed for use in a variety of industrial fields, such as an article conveyance system. In such a radio frequency identification system, it is common that the schottky diode is used to make the tag.

In order to send, for example, temperature data in addition to the identification data needed for identification, a sensor is included in the conventional tag 10, and data measured by the sensor is transmitted together with the identification data. In this case, the inclusion of the sensor increases the size and manufacture cost of the tag 10. Furthermore, additional power loss is caused by the sensor.

Meanwhile, the schottky diode has a characteristic that a change in temperature leads to a change in impedance, voltage sensitivity, and the like. In particular, since the voltage sensitivity becomes degraded as the temperature becomes higher, output voltage from the schottky diode is reduced in size. Thus, power efficiency is degraded in high-temperature environments.

SUMMARY OF THE INVENTION

It is an aspect of the present invention to provide a tag and method for sensing change in temperature from a change in a property of a schottky diode without adding a separate sensor, and additionally transmitting data for the sensed temperature change.

It is another aspect of the present invention to provide a tag and method for compensating influence of temperature change to prevent degradation of power efficiency of a schottky diode when the temperature change is sensed from change in the schottky diode's property.

In accordance with an exemplary embodiment of the present invention, there is provided a radio frequency identification tag, including: an antenna unit for receiving an external magnetic wave to generate an induced current; a driving voltage generating unit for converting the induced current into a given size of constant voltage and outputting the constant voltage; a state detecting unit for detecting an operational state of the driving voltage generating unit; a memory for storing temperature data corresponding to the detected operational state and identification data needed for identification; and a controlling unit for reading out, from the memory, the temperature data dependent on the operational state detected by the state detecting unit and the identification data, and externally outputting the read temperature and identification data via the antenna unit.

The tag may further include a transmission signal generating unit for combining the temperature data and the identification data to generate a transmission signal, and to externally transmit the transmission signal via the antenna unit under the control of the controlling unit.

The driving voltage generating unit may be implemented by a circuit comprising at least one schottky diode.

The state detecting unit may check the size of the constant voltage output from the driving voltage generating unit and detect change in at least one property of the schottky diode.

In accordance with another exemplary embodiment of the present invention, the radio frequency identification tag may further include a state compensating unit for applying a given size of a bias signal dependent on the change in a property of a schottky diode to the driving voltage generating unit, to compensate the size of the constant voltage output from the driving voltage generating unit.

In accordance with yet another exemplary embodiment of the present invention, there is provided a radio frequency identification tag, including: an antenna unit for receiving an external magnetic wave to generate an induced current; a driving voltage generating unit for converting the induced current into a given size of constant voltage and outputting the constant voltage; a temperature sensor for detecting temperature; a state compensating unit for applying a given bias signal to the driving voltage generating unit; and a controlling unit for controlling the state compensating unit to adjust the size of the bias signal depending on the temperature detected by the temperature sensor, and to apply the adjusted bias signal to the driving voltage generating unit. Accordingly, that the degradation of the voltage conversion efficiency of the driving voltage generating unit, due to temperature change, is prevented or reduced.

Further, in accordance with yet another exemplary embodiment of the present invention, there is provided a method for radio frequency identification in a radio frequency identification system, including: (a) receiving an external magnetic wave to generate an induced current; (b) converting the induced current into a constant voltage using a constant voltage circuit; (c) detecting information about a change in an operational state of the constant voltage circuit; (d) reading out, from a memory, temperature data which is dependent on at least one of the information about a change in the operational state and identification data needed for identification; and (e) combining the temperature data and the identification data to generate a transmission signal, and then to externally transmit the transmission signal.

The constant voltage circuit may include at least one schottky diode.

The step (c) may include checking the size of the constant voltage converted by the constant voltage circuit and detecting a change in a schottky diode's property to use the change as the information about the change in the operational state.

The method may further include generating a bias signal which is dependent on the information about the change in the operational state; and applying the bias signal to the constant voltage circuit to compensate for the size of the constant voltage output from the constant voltage circuit.

Meanwhile, according to yet another exemplary embodiment of the present invention, a separate temperature sensor may be used to measure the temperature for the purpose of compensating the size of the output voltage. By adjusting the size of the bias signal, depending on the measured temperature, it is possible to prevent efficiency of the constant voltage circuit from being degraded.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS

Hereinafter, the present invention will be described in detail with reference to the accompanying drawings.

Figure 2:
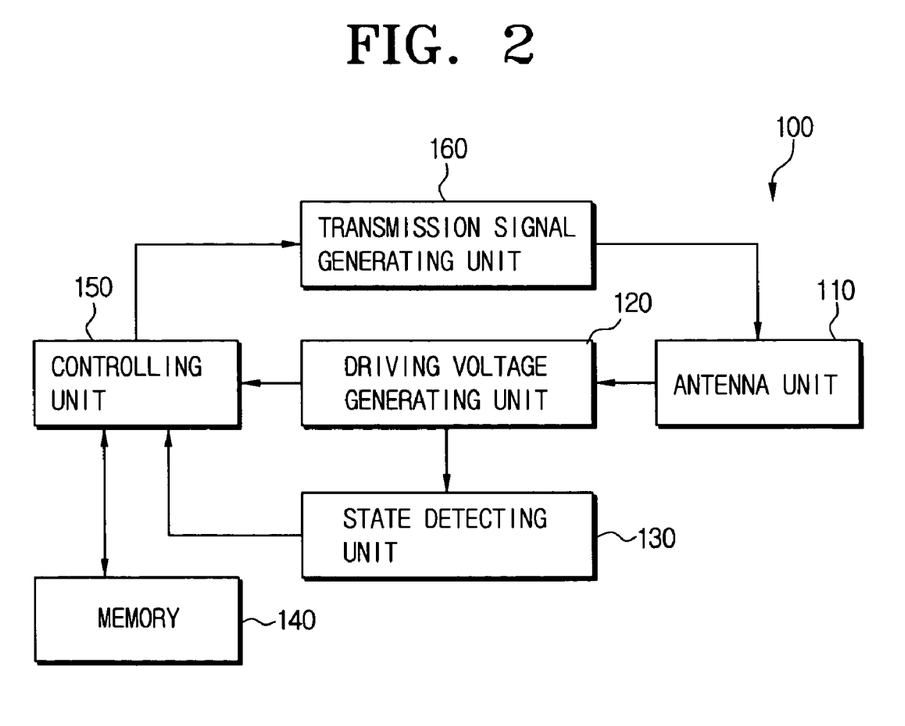
FIG. 2 is a block diagram illustrating a configuration of a tag according to an exemplary embodiment of the present invention.

FIG. 2 is a block diagram illustrating a configuration of a tag 100 for radio frequency identification according to an exemplary embodiment of the present invention. Referring to FIG. 2, the radio frequency identification tag 100 includes an antenna unit 110, a driving voltage generating unit 120, a state detecting unit 130, a memory 140, a controlling unit 150, and a transmission signal generating unit 160.

The antenna unit 110 serves to receive an external magnetic wave, or waves, and generate an induced current and to externally transmit a given radio frequency signal. The antenna unit 110 includes any type of coil made of a conductive material. In the case of a passive radio frequency identification system, the antenna unit 110 will receive the magnetic wave emitted from a reader unit 20 as the reader unit 20 approaches the tag 100. A current is induced in the coil of the conductive material according to Faraday's law.

The driving voltage generating unit 120 receives the induced current, generated from the antenna unit 110, and converts the induced current into a constant voltage. At this time, the conversion of the induced current to the constant voltage needs a rectifying circuit or a wave detection circuit (Not Shown). The rectifying circuit is typically a combination of diodes, capacitors and the like. As described above, it is common that a typical diode is not suitable for a high frequency band, and accordingly a schottky diode is used to implement the rectifying circuit. The schottky diode is a diode that forms a schottky barrier blocking reverse voltage at a contact surface between a conductor and an N type semiconductor, wherein the conductor is connected to the N type semiconductor. The schottky diode is suitable for a high frequency rectifying circuit because of its smaller forward voltage compared to the typical rectifying diode. The constant voltage generated by the driving voltage generating unit 120 is used to drive the controlling unit 150, the memory 140, and the like.

Meanwhile, the schottky diode has properties such that voltage sensitivity, or impedance, thereof varies with the temperature of the schottky diode.

Figure 3A:
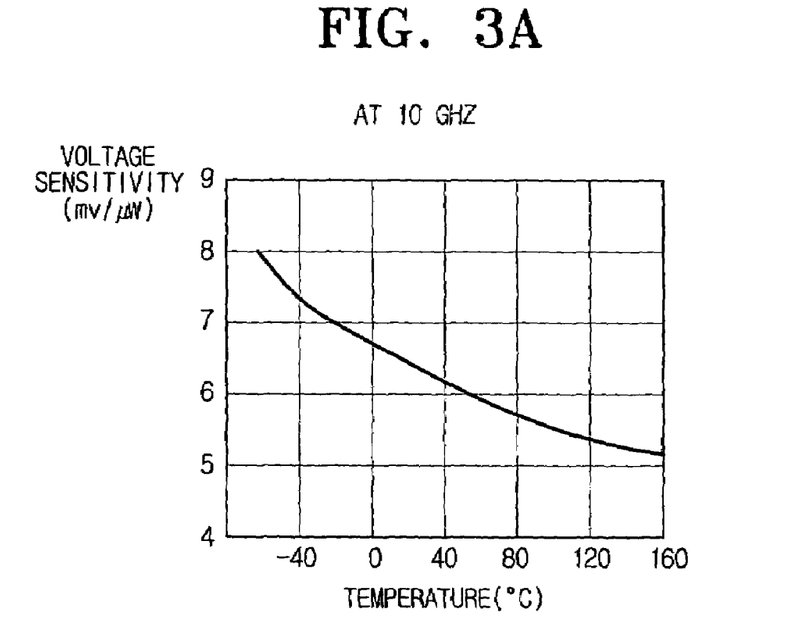
FIGS. 3A and 3B are graphs illustrating the change in voltage sensitivity, dependent on temperature, in a schottky diode.
Figure 3B:
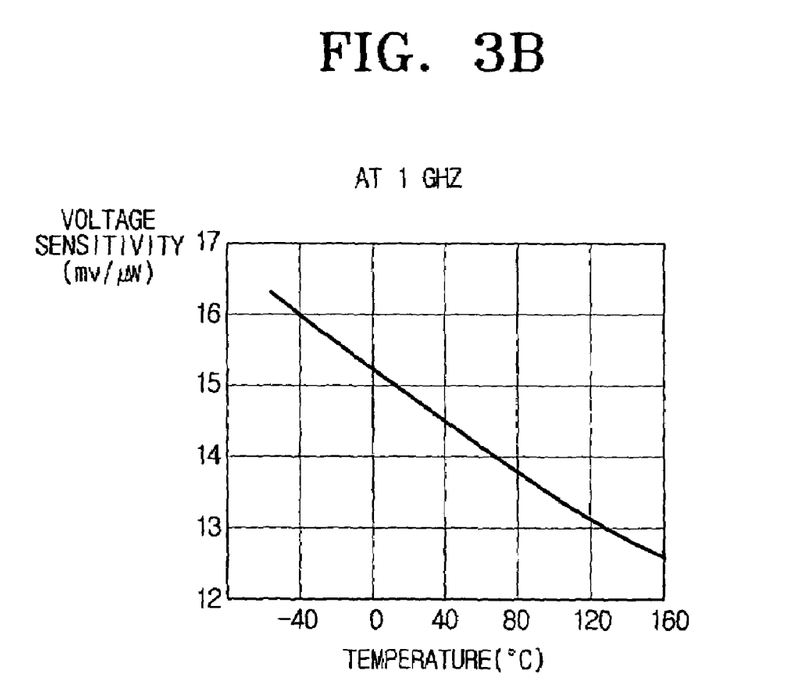

FIGS. 3A & 3B are graphs illustrating change in the voltage sensitivity of the schottky diode depending on the temperature. FIG. 3A is a graph illustrating the change in the voltage sensitivity in a radio frequency band of 10 GHz. It can be seen from FIG. 3A that the voltage sensitivity is degraded as the temperature increases. The voltage sensitivity exhibits a relatively linear reduction.

FIG. 3B is a graph illustrating the change in the voltage sensitivity in a radio frequency band of 1 GHz. It can be seen from FIG. 3B that the voltage sensitivity is degraded linearly as the temperature increases. The voltage sensitivity may be calculated by an equation—output voltage/input power. Thus, the change in the voltage sensitivity of the schottky diode may be detected from the size of the output voltage of the driving voltage generating unit 120.

Figure 4:
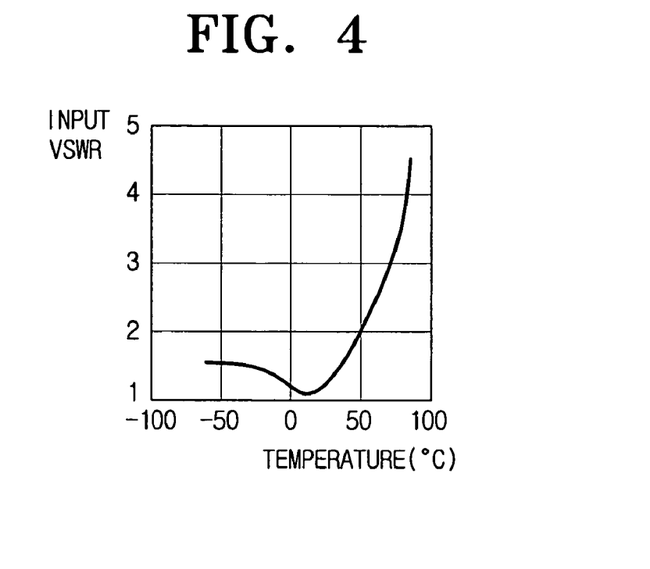
FIG. 4 is a graph illustrating the change in VSWR dependent on temperature in a schottky diode.

FIG. 4 is a graph illustrating change in a voltage standing wave ratio (VSWR) of a schottky diode depending on the temperature. The VSWR means a matching degree between characteristic impedance of a circuit and impedance of a load. Thus, the change in the VSWR is proportional to the change in the impedance of a schottky diode. Referring to FIG. 4, the VSWR becomes substantially 1 at about 0° C. VSWR=1 means that the impedance match is made. The VSWR value becomes greater as the temperature increases from 0° C. This indicates that the impedance of the schottky diode was changed. Meanwhile, since the output impedance of the driving voltage generating unit 120 is proportional to the output voltage, the change in the impedance of the schottky diode may be obtained from the change in the output voltage.

The memory 140 stores temperature data dependent on voltage sensitivity change, temperature data dependent on VSWR change (i.e., impedance change), or the like. Since the voltage sensitivity change and the impedance change can be both seen from the change in the size of the output voltage as described above, it allows the memory 140 to store only the temperature data dependent on the size of the output voltage. Meanwhile, the memory 140 also stores identification data needed for identification in addition to the temperature data. When an object with the tag 100 is a person, the identification data may include name, birth date, social position, and the like of the person. When the object is an article, the identification data may include information such as the type and manufacture date of the article.

Meanwhile, the state detecting unit 130 determines how an operational state of the driving voltage generating unit 120 changes. That is, the state detecting unit 130 may detect the voltage sensitivity or the impedance by checking the size of the output voltage and comparing the size to the input power. The state detecting unit 130 transmits the detected voltage sensitivity or impedance change, as the information about the change in the operational state, to the controlling unit 150.

The controlling unit 150 extracts from the memory 140 the temperature data corresponding to the information about the change in the operational state, which is detected by the state detecting unit 130. If the property exhibits a linear change depending on the temperature, as shown in FIG. 3, it is not required to store the temperature data in the memory 140 since the controlling unit 150 may directly calculate and use the temperature data.

Meanwhile, the controlling unit 150 also reads out the identification data needed for identification from the memory 140. The controlling unit 150 controls the transmission signal generating unit 160 to generate a transmission signal containing the identification data and the temperature data. That is, the transmission signal generating unit 160 combines the identification data and the temperature data to generate the transmission signal as a radio frequency signal and externally transmits the transmission signal via the antenna unit 110.

The reader unit 20 receives the transmission signal, performs identification based on the identification data and at the same time, confirms the temperature information of the object with the tag 100.

Figure 5:
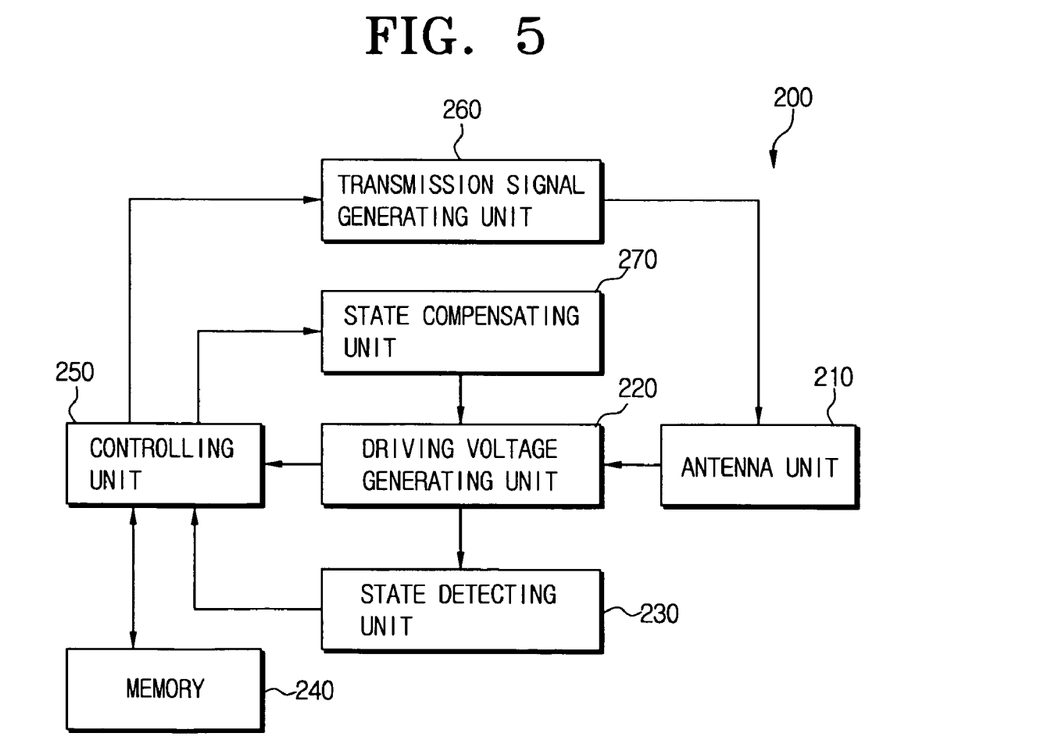
FIG. 5 is a block diagram illustrating a configuration of a tag according to a second exemplary embodiment of the present invention.

FIG. 5 is a block diagram illustrating a configuration of a radio frequency identification tag 200 according to a second exemplary embodiment of the present invention. Referring to FIG. 5, the radio frequency identification tag 200 includes a state compensating unit 270 as well as an antenna unit 210, a driving voltage generating unit 220, a state detecting unit 230, a memory 240, a controlling unit 250, and a transmission signal generating unit 260.

The state compensating unit 270 compensates the voltage conversion efficiency of the driving voltage generating unit 220 when the voltage conversion efficiency is degraded due to a change in a property of the schottky diode dependent on temperature. Specifically, the state compensating unit 270 applies a proper size of bias signal to the driving voltage generating unit 220, when the voltage sensitivity of the schottky diode included in the driving voltage generating unit 220 is degraded with temperature. In this case, the bias signal may be current. The controlling unit 250 controls the state compensating unit 270 to apply the proper size of bias current to the driving voltage generating unit 220 when it is detected by the state detecting unit 230 that the output voltage of the driving voltage generating unit 220 is being reduced.

Meanwhile, the temperature change should be first detected to compensate for the influence of the temperature change using the state compensating unit 270. The temperature change may be detected using the state detecting unit 230, as described above. Alternatively, the temperature change may be measured using a separate temperature sensor. Since the components other than the state compensating unit 270 and the controlling unit 250 have been previously discussed in conjunction with the embodiment shown in FIG. 2, further description thereon will be omitted.

Figure 6:
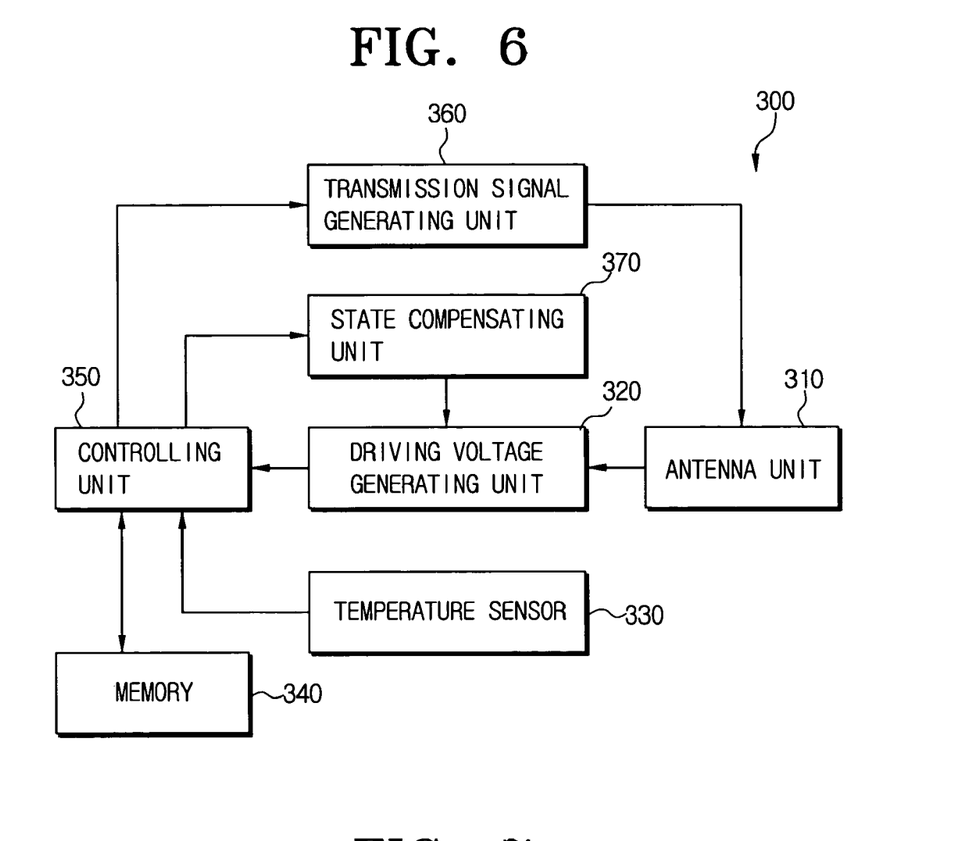
FIG. 6 is a block diagram illustrating a configuration of a tag according to a third exemplary embodiment of the present invention.

FIG. 6 is a block diagram illustrating a radio frequency identification tag 300 according to a third exemplary embodiment of the present invention. Referring to FIG. 6, a radio frequency identification tag 300 includes a temperature sensor 330 as well as an antenna unit 310, a driving voltage generating unit 320, a memory 340, a controlling unit 350, a transmission signal generating unit 360, and a state compensating unit 370.

The temperature sensor 330 may be a schottky diode. When the temperature sensor 330 senses change in temperature, the controlling unit 350 controls the state compensating unit 370 to apply a proper size of a bias signal under the prediction that voltage conversion efficiency of the driving voltage generating unit 320 would be degraded. As a result, it is possible to compensate for the influence of the temperature on the system.

Figure 7:
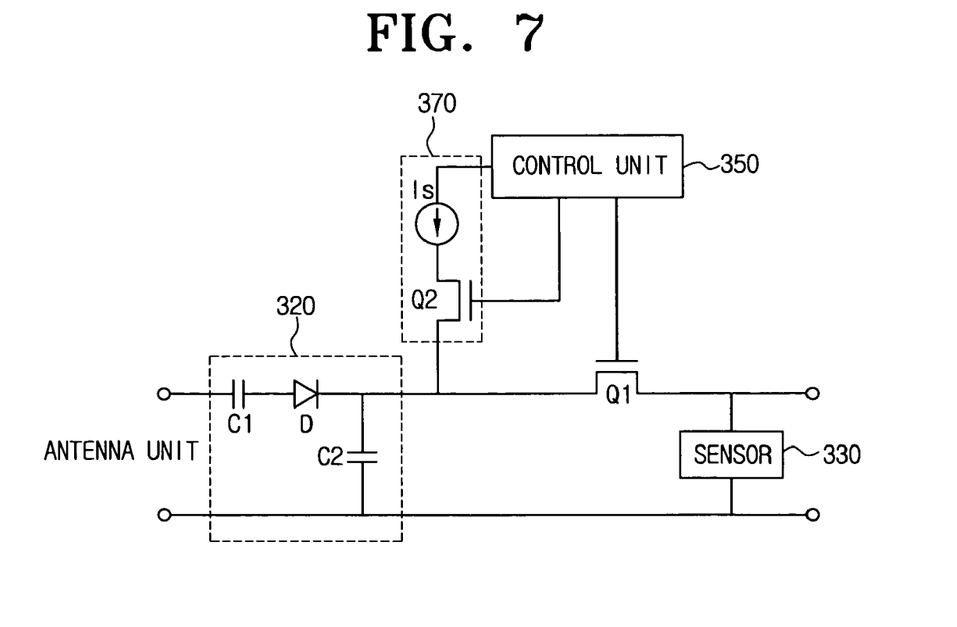
FIG. 7 is a circuit diagram of a driving voltage generating unit and a state compensating unit used in the tag of FIG. 6.

FIG. 7 is a circuit diagram illustrating a detailed configuration of the driving voltage generating unit 320 and the state compensating unit 370 making up the radio frequency identification tag of FIG. 6. Referring to FIG. 7, the driving voltage generating unit 320 includes a rectifying circuit that is a combination of several capacitors C1 and C2 and a diode D. For the diode D, a schottky diode may be used for operation in a high frequency band.

The temperature sensor 330 is connected to an output of the driving voltage generating unit 320. For the temperature sensor 330, a schottky diode may be used. Since the temperature sensor 330 does not need to continue to measure the temperature of the driving voltage generating unit 320, the controlling unit 350 controls the operation of the temperature sensor 330 using an FET switch Q1. This makes it possible to minimize power consumption in the temperature sensor 330.

The temperature sensor 330 measures the temperature, and the controlling unit 350 determines whether there is temperature change, based on the measurement. As a result, when determining that the voltage conversion efficiency of the driving voltage generating unit 320 is degraded, the controlling unit 350 controls the state compensating unit 370 to apply the proper size of a bias current to the driving voltage generating unit 320. At this time, the controlling unit 350 may directly adjust the size of the bias current by controlling a current source Is or may adjust the size using an FET Q2.

The components other than the temperature sensor 330, the state compensating unit 370, and the controlling unit 350 have been previously discussed in conjunction with the embodiment shown in FIG. 2, further description thereon will be omitted.

Figure 8A:
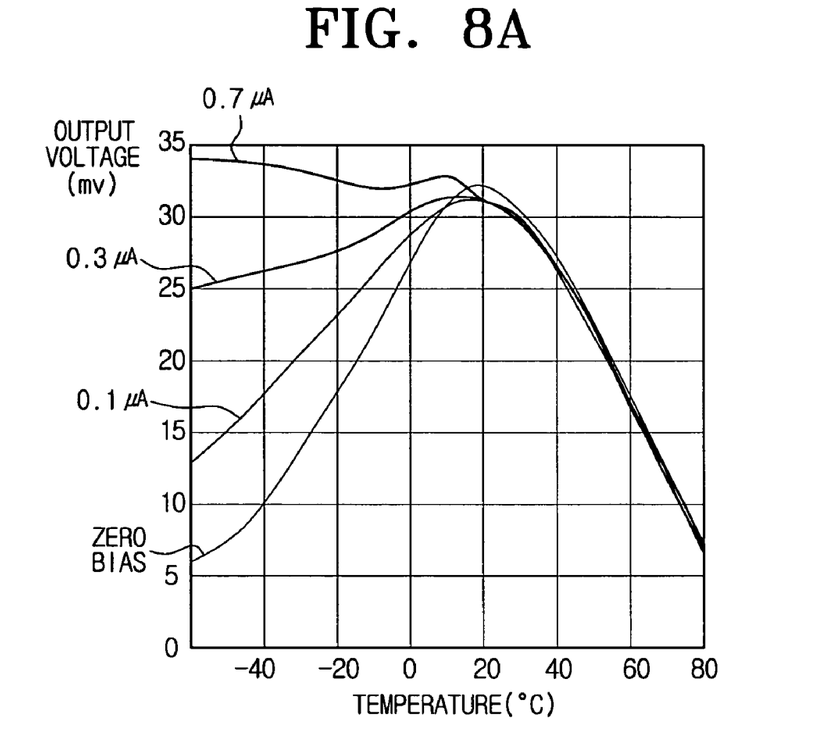
FIGS. 8A and 8B are graphs illustrating change in a property of a schottky diode depending on bias current.
Figure 8B:
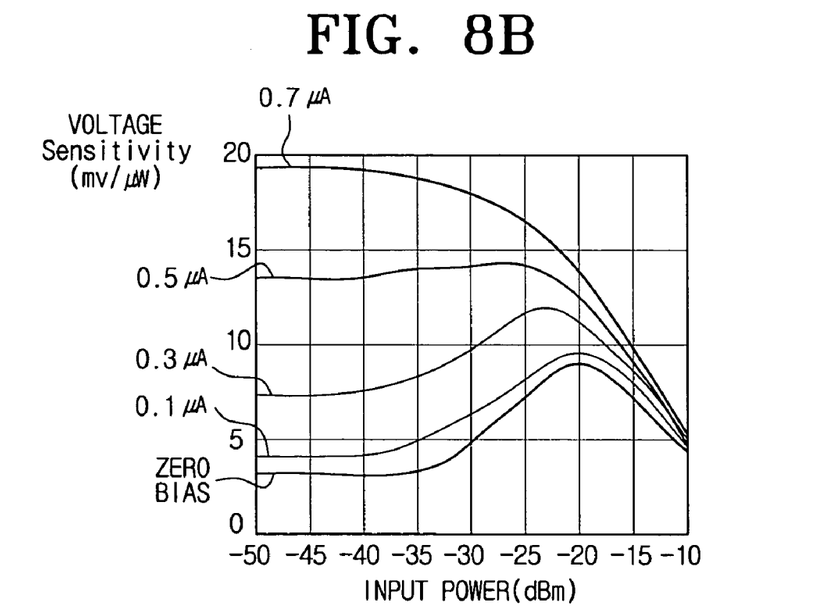

FIGS. 8A & 8B are graphs illustrating the change in a property of a schottky diode depending on the bias current. FIG. 8A is a graph illustrating the change in the size of the output voltage. It can be seen from FIG. 8A that, until the temperature reaches 20° C., the output voltage increases as the bias current increases.

FIG. 8B is a graph illustrating the change in the voltage sensitivity of a schottky diode depending on a bias current. It can be seen from FIG. 8B that the greater the bias current, the better the voltage sensitivity.

Thus, through the adjustment of the bias current to a suitable size, the output voltage or the voltage sensitivity can be maintained when being reduced due to the temperature increase, within a certain temperature range.

Figure 9:
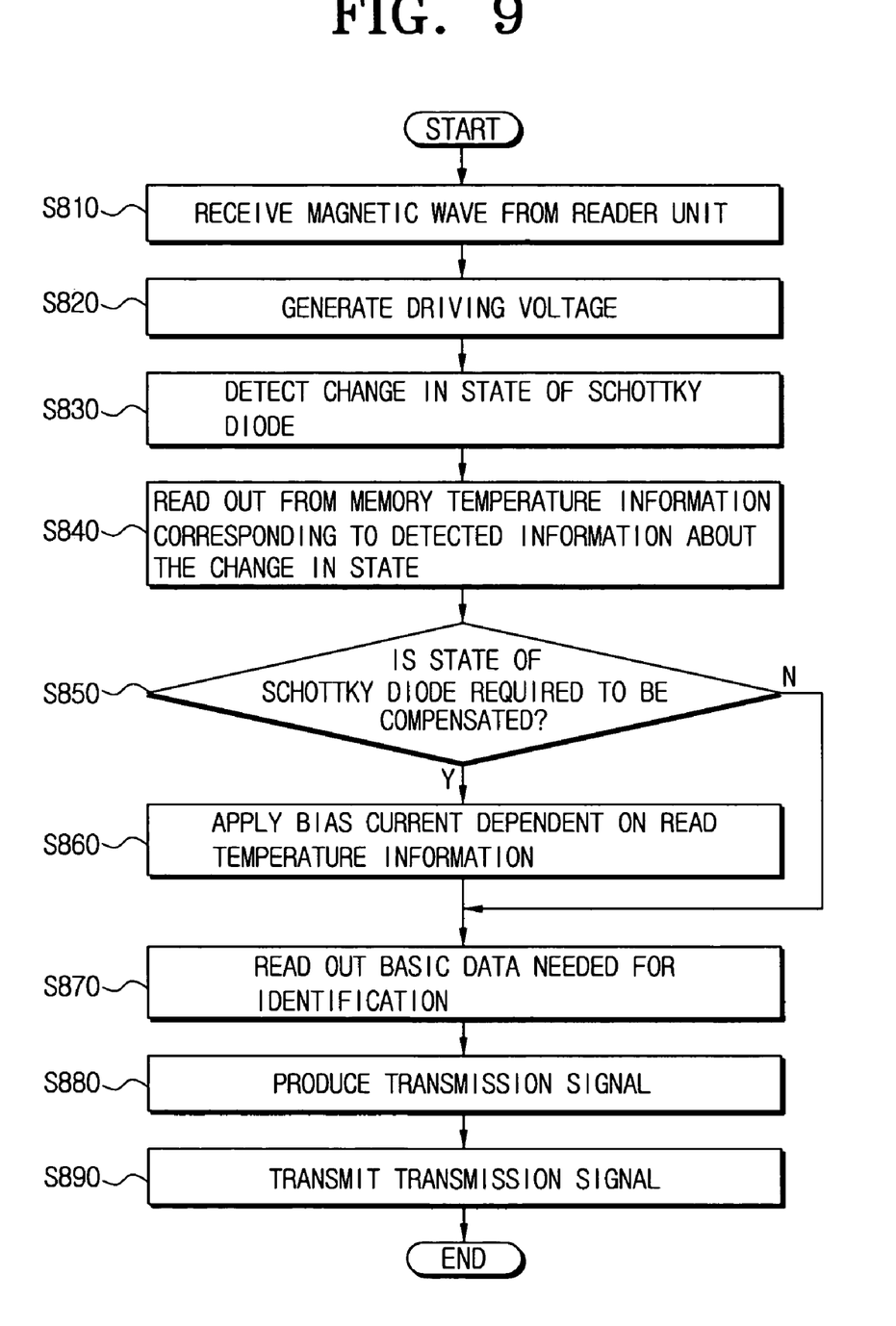
FIG. 9 is a flow diagram illustrating a method for radio frequency identification in a tag according to an exemplary embodiment of the present invention.

FIG. 9 is a flow diagram illustrating a method for radio frequency identification according to an exemplary embodiment of the present invention. Referring to FIG. 9, the tag first receives a magnetic wave from the reader unit 20 (S810). Current is induced at the coil by the received magnetic wave according to Faraday's law.

The induced current is converted to a constant voltage by the constant voltage circuit (S820). The constant voltage circuit may be a rectifying circuit, a wave detection circuit, or the like, that is a combination of components, such as a schottky diode and capacitors.

The tag then detects the change in the state of the schottky diode from the size of the constant voltage (S830). For example, the tag is able to detect the change in the voltage sensitivity, the impedance, or the like, of the schottky diode.

The tag then reads out, from the memory, temperature data corresponding to the detected information about the change in the operational state (S840).

According to another exemplary embodiment of the present invention, the method may include compensating the change in a property of the schottky diode dependent on the temperature change, to prevent the voltage conversion efficiency from being degraded. In other words, if it is determined, based on the current temperature data, that the change in the schottky diode's property is required to be compensated (S850), a given size of bias current dependent on the read temperature data is applied to the constant voltage circuit (S860). The size of the bias current dependent on the temperature data may be determined from the graphs of FIGS. 8A & 8B.

The temperature data may be measured using a separate temperature sensor. Alternatively, the temperature may be detected from the change in the state of the schottky diode as described above. Further, the combination of a separate FET switch into the temperature sensor enables the temperature sensor to be switched on or off. This would assist in minimizing power consumption in the temperature sensor.

Meanwhile, the tag reads out the identification data needed for identification from the memory, in addition to the temperature data (S870). The tag combines the identification data and the temperature data to produce a transmission signal (S880). The tag transmits the produced transmission signal via the antenna unit (S890).

The transmission signal is received by the reader unit. The reader unit extracts the identification data from the transmission signal and performs identification based on the identification data. The reader unit also extracts the temperature data from the transmission signal to confirm current temperature of the object with the tag.

As described above, according to the present invention, it is possible to detect the temperature data from the change in a property of the schottky diode making up the rectifying circuit without adding separate hardware. In turn, it is possible to solve problems with prior systems, such as increase of manufacture cost, power consumption, and the like, caused by use of an additional temperature sensor. Meanwhile, it is possible to compensate for a property change of the schottky diode dependent on the temperature by adjusting the size of the internal bias signal depending on the temperature data. This solves a problem of voltage efficiency degradation.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, the scope of the present invention should not be limited to the illustrated embodiments and should be defined by the claims described below and equivalents thereof.

What is claimed is:

1. A radio frequency identification tag comprising:
   an antenna unit which receives an external magnetic wave to generate an induced current;
   a driving voltage generating unit which converts the induced current into a constant voltage and outputs the constant voltage;
   a state detecting unit which detects an operational state of the driving voltage generating unit;
   a memory which stores temperature data corresponding to the detected operational state and identification data needed for identification; and
   a controlling unit which reads out, from the memory, the temperature data dependent on the operational state detected by the state detecting unit and the identification data, and externally outputs the temperature data and identification data via the antenna unit.

2. The tag as claimed in claim 1, further comprising:
   a transmission signal generating unit which combines the temperature data and the identification data to generate a transmission signal and to externally transmit the transmission signal via the antenna unit.

3. The tag as claimed in claim 1, wherein the driving voltage generating unit comprises at least one schottky diode.

4. The tag as claimed in claim 3, wherein the state detecting unit checks a size of the constant voltage output from the driving voltage generating unit and detects a change in a property of the at least one schottky diode.

5. The tag as claimed in claim 4, further comprising:
   a state compensating unit which applies a bias signal to the driving voltage generating unit to change a size of the constant voltage output from the driving voltage generating unit.

6. The tag as claimed in claim 5, wherein a size of the bias signal is dependent on the change in the property of the schottky diode.

7. The tag as claimed in claim 1, further comprising a temperature sensor which provides a temperature reading to the controlling unit.

8. The tag as claimed in claim 1, wherein the stored temperature data is based on a voltage sensitivity change of the output constant voltage or an impedance change of the output constant voltage.

9. A radio frequency identification tag comprising:
- an antenna unit which receives an external magnetic wave to generate an induced current;
- a driving voltage generating unit which converts the induced current into a constant voltage and outputs the constant voltage;
- a temperature sensor which detects a temperature;
- a state compensating unit which applies a bias signal to the driving voltage generating unit; and
- a controlling unit which controls the state compensating unit to adjust a size of the bias signal depending on the temperature detected by the temperature sensor, and to apply an adjusted bias signal to the driving voltage generating unit.

10. The tag of claim 9, further comprising:
- a transmission signal generating unit which combines the temperature and identification data obtained from a memory to generate a transmission signal to be externally transmitted via the antenna unit.

11. The tag as claimed in claim 9, wherein the temperature sensor is a schottky diode.

12. A method for radio frequency identification in a radio frequency identification system, the method comprising:
  (a) receiving an external magnetic wave and generating an induced current based on the magnetic wave;
  (b) converting the induced current into a constant voltage using a constant voltage circuit;
  (c) detecting information about a change in an operational state of the constant voltage circuit;
  (d) reading out, from a memory, temperature data dependent on the information about the change in the operational state and identification data needed for identification; and
  (e) combining the temperature data and the identification data to generate a transmission signal.

13. The method as claimed in claim 12, further comprising externally transmitting the transmission signal.

14. The method as claimed in claim 12, wherein the constant voltage circuit comprises at least one schottky diode.

15. The method as claimed in claim 12, wherein the operation (c) comprises:
- checking a size of the constant voltage converted by the constant voltage circuit and detecting a change in a property of a schottky diode to use the change as detected information about the change in the operational state.

16. The method as claimed in claim 15, further comprising:
- generating a bias signal dependent on the information about the change in the operational state; and
- applying the bias signal to the constant voltage circuit to adjust the size of the constant voltage output from the constant voltage circuit.

17. A method for radio frequency identification in a radio frequency identification system, comprising:
  (a) receiving an external magnetic wave and generating an induced current based on the magnetic wave;
  (b) converting the induced current into a constant voltage using a constant voltage circuit;
  (c) measuring a temperature to obtain temperature data;
  (d) applying a bias signal to the constant voltage circuit depending on the temperature data to adjust a size of the constant voltage output from the constant voltage circuit; and
  (e) reading out data needed for identification from a memory and externally transmitting the identification data as a radio frequency signal.

18. The method as claimed in claim 17, where the temperature data is combined with the identification data and transmitted together.

* * * * *